United States Patent Office 3,367,178
Patented Feb. 6, 1968

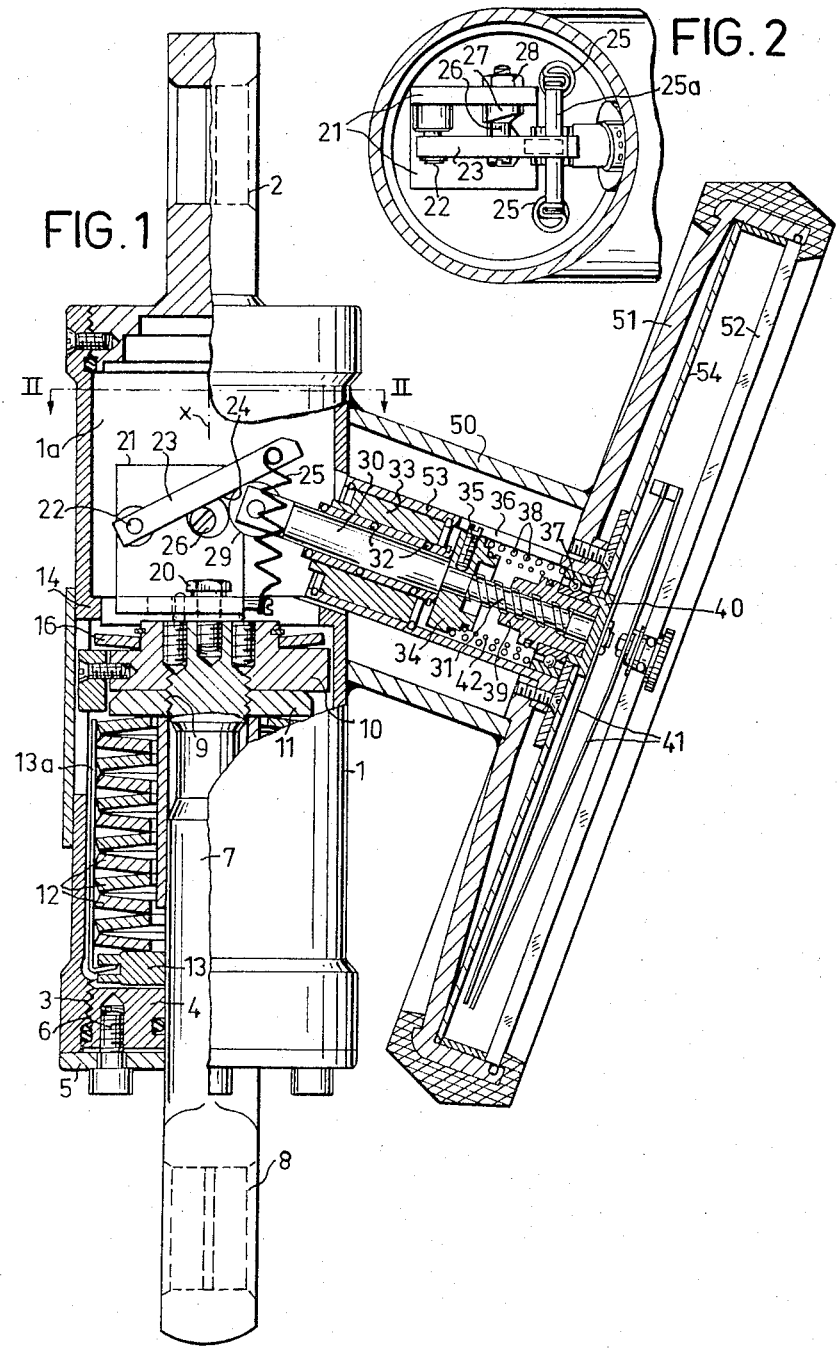

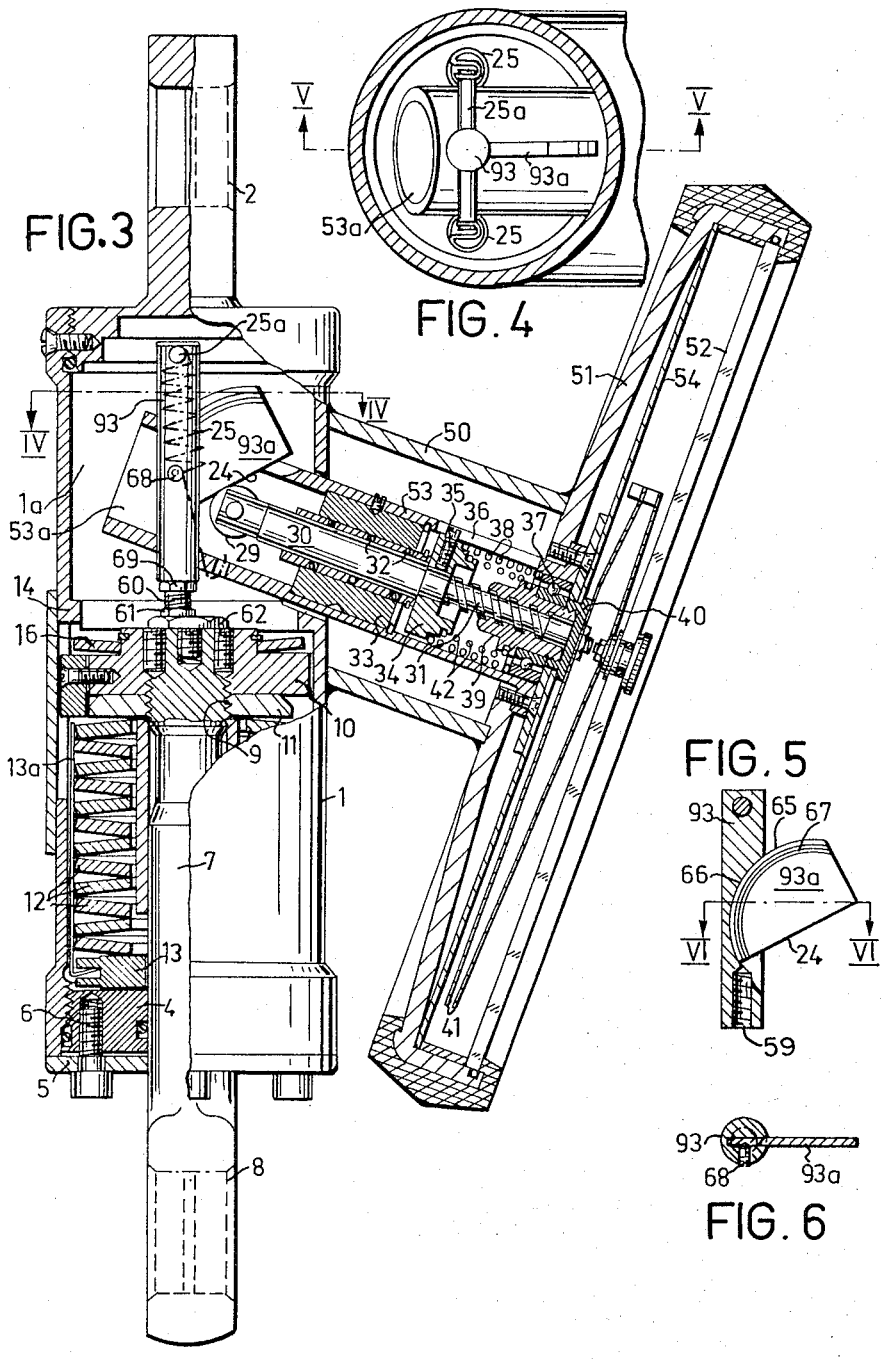

3,367,178
DEVICE FOR READING THE DEFLECTION OF A DYNAMOMETER
Sven Axel Tell and Anders Bengt Tell, both of Vikingavagen 3, Danderyd, Sweden
Filed Apr. 22, 1966, Ser. No. 544,450
Claims priority, application Sweden, Apr. 27, 1965, 5,504/65
8 Claims. (Cl. 73—141)

This invention relates to a dynamometer comprising a casing and a draw-rod longitudinally displaceable in the casing against the action of spring elements, the force or weight to be measured being applied to the draw-rod, wherein the spring elements preferably consist of annular conical disc springs surrounding the draw-rod and arranged between a stop means provided on the draw-rod and a preferably axially adjustable support provided at one end of the casing.

The object of the invention is to provide a reliably operating and shock-protected device for transmitting the measuring movements of the draw-rod to a pointer means located laterally of the casing. In its broadest aspect the invention is characterized in that, in that chamber of the casing which is remote from the power absorbing spring elements, there is provided a transmission member which is displaceable longitudinally of the draw-rod and by means of a spring acting toward the spring elements is held pressed against an abutment connected to the draw-rod so as to take part in the normal movements of the draw-rod, said transmission member having a control surface which extends obliquely with respect to the axis of the draw-rod and faces the spring elements and engages a roller rotatably mounted on a spindle which is longitudinally displaceable in lateral extension of the casing of the dynamometer, the outer end of said spindle being connected, via transmission members, to a pointer for reading the axial displacement of the spindle corresponding to the load responsive displacement of the draw-rod as the roller on the spindle travels along the control surface.

The invention is described more closely hereinbelow with reference to embodiments illustrated in the annexed drawings.

FIG. 1 is a partially sectional elevation of the dynamometer according to a first embodiment. FIG. 2 is a sectional view taken along the line II—II in FIG. 1. FIG. 3 illustrates a second embodiment in the same manner as FIG. 1. FIG. 4 is a sectional view taken along the line IV—IV in FIG. 3. FIG. 5 is a sectional view of a detail along the line V—V in FIG. 4, and FIG. 6 is a sectional view taken along the line VI—VI in FIG. 5.

Reference numeral 1 denotes the cylindrical casing of the apparatus to one end of which a fixing yoke 2 is secured by a threaded connection. At the other end a bottom ring 4 is screwed into an internal thread 3, and this end is covered by a bottom plate 5 through which pass a plurality of fixing screws 6 screwed into the bottom ring 4. The draw-rod which is denoted at 7 is provided with a hole 8 for a fixing bolt or the like. By means of the members 2, 7 and 8 the dynamometer is inserted between two parts for measuring the tension or load applied thereto.

The draw-rod has a thread 9 the outside diameter of which is substantially equal to the general diameter of the draw-rod. Screwed onto the thread are a piston 10 and a ring 11 which together form an abutment for a series of power-absorbing conical disc springs 12 surrounding the draw-rod. On the opposite or outer side the set of springs is supported against a ring 13 which rests on the bottom ring 4. Numeral 13a denotes thin flat bars which are secured to the ring 13 and guide the disc springs 12 at their peripheries.

The casing has an annular internal fixed flange 14. Inserted between this flange and the piston 10 is a disc spring 16 which serves as a resilient protective stop for instance in the event of rupture of the cable or the like attached to the draw-rod or when the load rapidly decreases in some other manner so that the compressed disc springs force the draw-rod inward.

When the draw-rod is under tension it is displaced in an outward direction under compression of the disc the tension or weight that is to be measured. In the embodiment illustrated in FIGS. 1 and 2 this is accomplished by the following means.

Non-rotatably secured to the inner end of the draw-rod by means of a screw 20 is a holder 21 having a pivot 22 for a transmission member in the form of an arm 23 having a lower control surface 24. Inserted between the free end of the arm and the lower portion of the holder is a tension spring 25 which holds the arm passed against an abutment which is adjustably mounted on the holder and in the embodiment exemplified consists of a pin 26 eccentrically mounted on a bolt 27 which can be turned in the holder 21 and locked in adjusted angular position by means of a nut 28. The arm 23 and the control surface 24 are held in an obliquely upwardly directed position relative to the axis of the draw-rod 7.

The control surface 24 is in contact with an antifriction roller 29 which is rotatably mounted on a spindle 30 extending outward from the casing of the dynamometer within an obliquely downwardly directed tubular extension 50 sealingly welded to the casing 1. Sealingly welded to the outer end of the extension 50 is the bottom 51 of a large-diameter pointer case in which a pointer means is located behind a sealed window 52. Secured to the bottom 51 is a guide tube 53 through which the spindle 30 extends.

The spindle 30 the outer portion of which has a long-pitch flat screw thread 31 is longitudinally displaceably mounted in a ball race 32 in a bush 33 mounted in the guide tube 53. A ring 34 is secured to the spindle 30 by means of a set screw 35 which is movable in a longitudinal slot 36 in the guide tube 53, thereby to prevent turning movement of the spindle 30 upon longitudinal displacement under the action of the control surface 24. Between the ring 34 and the outer race of a ball bearing 37 mounted in the guide tube 53 there is inserted a spring 38 which biases the spindle 30 inwards with the roller 29 in engagement with the control surface 24.

Screwed onto the thread 31 is a sleeve 39 which by means of a washer 40 screwed thereon is secured to the inner race of the ball bearing 37 and consequently secured against axial displacement when the sleeve upon axial displacement of the spindle 30 is turned by the thread 31. The washer 40 is connected with a pointer 41 which consequently will take part in the turning movement of the sleeve 39 so that the axial displacement of the spindle 30 corresponding to the degree of compression of the dynamometer springs and consequently corresponding to the load or weight can be read off from a scale on the scale bottom 54 of the pointer case.

A helical spring 42 inserted between the ring 34 and the sleeve 39 tends to turn the sleeve toward the zero position of the pointer 41.

The control surface 24 is inclined to the axis of the draw-rod preferably at an angle between 10° and 45°, for instance between 15° and 30°. The tension of the springs 25 is sufficient to hold the arm 23 against the pin 26 and counterbalances the pressure between the control surface 24 and the roller 29 during operation of the apparatus. In operation the control surface 24 behaves like a part secured to the holder 21 and taking part in the displacement of the draw-rod 7. The function of the springs 25 is partly to enable fine adjustment of the inclination of the control surface by means of the eccentric pin 26 and partly to form a protection against shock damages in the event that the load or weight acting on the dynamometer rapidly ceases or varies to a great extent. In this case the draw-rod is rapidly forced inward by the disc springs 12 followed by a sudden retardation which will be smoothly damped by the springs. The springs need only be strong enough to maintain the normal contact between the parts 23 and 26. In the embodiment exemplified two springs are secured at one of their ends to a yoke 25a connected to the arm 23. They may be replaced by one or more compression springs acting on the arm or by a torsion spring secured to the pivot 22.

In the second embodiment illustrated in FIGS. 3 to 6 all parts except for those provided in chamber 1a of the casing which is remote from the spring elements 12 are similar to those shown in FIG. 1. In the second embodiment the transmission member having the control surface 24 for the roller 29 is longitudinally displaceably guided in an extension 53a of the guide tube 53. This extension 53a projects into the chamber 1a and is independent of the displacements of the draw-rod 7. The tension spring 25 is provided between the transmission member and the extension 53a of the tube 53. In this embodiment the spring-actuated transmission member consists of a bar 93 which has secured to it a plate 93a having the control surface 24. The bar 93 is guided in upper and lower holes in the portion 53a and is displaceable longitudinally of the axis of the draw-rod 7. At the end facing the draw-rod the bar has an internal thread 59, FIG. 5, into which is screwed an adjusting screw 60 having a head 61 which by the spring 25 is held against the end of the draw-rod or against a separate part 62 connected with the draw-rod such that the members 93, 93a will take part in normal axial movements of the draw-rod. As in the embodiment according to FIG. 1 the springs 25 form a protective stop for the transmission members.

Two spring 25 act upon a yoke 25a at the end of the bar 93. The plate 93a has a back 65 in the form of an arc of a circle. This back is guided in a correspondingly formed lateral groove 66 in the bar 93, FIGS. 5 and 6. One side of the plate has an arcuate groove 67 which is angular in cross-section. A set screw 68 screwed into the bar has a conical point which is in contact with the oblique side of the groove 67 facing the bar and forces the back of the plate against the bottom of the recess 66 in the bar. By loosening the screw 68 the plate 93a can be turned to a desired oblique position of the control surface 24, which is necessary only during assembly of the parts. Otherwise adjustment of the oblique surface 24 relative to the roller 29 is effected by means of the adjusting screw 60 which in adjusted position is retained by a lock nut 69.

What we claim is:

1. A dynamometer comprising a casing, a drawrod longitudinally displaceable in the casing, first spring means against the action of which the drawrod is longitudinally displaceable, an abutment movable with the drawrod, a transmission member, second spring means acting toward said first spring means to press said transmission member against said abutment, said transmission member being movable relative to and longitudinally of the drawrod away from said abutment, said transmission member having a control surface that extends obliquely with respect to the axis of the drawrod and that faces said first spring means, the casing having a lateral extension, a spindle movable axially in said extension and disposed at a substantial angle to the axis of said drawrod and at an acute angle to said control surface, a roller carried by said spindle and engaging said control surface, and indicia means responsive to axial movement of said spindle to indicate the magnitude of the load on the drawrod.

2. A dynamometer as claimed in claim 1, said transmission member being an arm pivotally mounted for movement with the drawrod.

3. A dynamometer as claimed in claim 2, the axis of pivotal movement of said transmission member being disposed on the side of the axis of said drawrod which is opposite said spindle.

4. A dynamometer as claimed in claim 1, and means for adjusting the position of said abutment thereby to alter the inclination of said control surface relative to the axis of the drawrod.

5. A dynamometer as claimed in claim 4, said adjustable abutment comprising an eccentrically disposed rotatable pin.

6. A dynamometer as claimed in claim 1, said transmission member comprising a bar separate from but movable longitudinally with the drawrod.

7. A dynamometer as claimed in claim 6, and a plate adjustably secured to said bar, said control surface being disposed on said plate.

8. A dynamometer as claimed in claim 1, and a long-pitch flat screw threaded on a portion of the spindle remote from said roller, said indicia means including a sleeve mounted for rotation but secure against axial displacement and in screwthreaded engagement with said spindle, and a pointer driven by the sleeve.

References Cited
UNITED STATES PATENTS

| | | | |
|---|---|---|---|
| 1,333,802 | 3/1920 | Fletcher | 177—232 |
| 1,845,098 | 2/1932 | Pollack | 73—141 |
| 2,703,980 | 3/1955 | Tell | 73—141 |

RICHARD C. QUEISSER, *Primary Examiner.*

JAMES GILL, *Examiner.*

C. A. RUEHL, *Assistant Examiner.*